US006925897B2

(12) United States Patent
Cirio

(10) Patent No.: US 6,925,897 B2
(45) Date of Patent: Aug. 9, 2005

(54) DEVICE AND A METHOD FOR CHECKING THE FITTING OF A THREADED CAP ONTO A CONTAINER

(75) Inventor: Sergio Cirio, Canelli (IT)

(73) Assignee: Arol S.p.A., Canelli (IT)

( * ) Notice: Subject to any disclaimer, the term of this patent is extended or adjusted under 35 U.S.C. 154(b) by 0 days.

(21) Appl. No.: 10/755,397

(22) Filed: Jan. 13, 2004

(65) Prior Publication Data

US 2004/0139811 A1 Jul. 22, 2004

Related U.S. Application Data

(62) Division of application No. 09/717,025, filed on Nov. 22, 2000, now Pat. No. 6,679,026.

(30) Foreign Application Priority Data

Nov. 23, 1999 (EP) .......................................... 99830720

(51) Int. Cl.[7] .............................................. G01M 19/00
(52) U.S. Cl. .................................................... 73/865.8
(58) Field of Search ............................ 73/865.8, 865.9; 209/523, 522; 53/396, 490, 500, 505, 506, 507, 317, 331.5, 53

(56) References Cited

U.S. PATENT DOCUMENTS

| | | | |
|---|---|---|---|
| 3,724,162 | A | 4/1973 | Lorenzini et al. |
| 4,098,053 | A | 7/1978 | Shank |
| 4,222,215 | A | 9/1980 | Takano |
| 4,596,107 | A | 6/1986 | Pfleger, Sr. |
| 4,608,805 | A | 9/1986 | Kelly |
| 4,614,077 | A | 9/1986 | Muto et al. |
| 4,616,466 | A | 10/1986 | Tanaka et al. |
| 4,773,204 | A | 9/1988 | Rydstrom |
| 5,152,182 | A | 10/1992 | Searle |
| 5,321,935 | A | 6/1994 | Spatz |
| 5,400,564 | A | 3/1995 | Humphries et al. |
| 5,415,050 | A | 5/1995 | Trendel et al. |
| 5,419,094 | A | 5/1995 | Vander et al. |
| 6,105,343 | A | 8/2000 | Grove et al. |

FOREIGN PATENT DOCUMENTS

| | | |
|---|---|---|
| EP | 0 447 641 A1 | 12/1990 |
| EP | 0 571 980 A | 12/1993 |
| EP | 0 636 573 A | 2/1995 |

*Primary Examiner*—Robert Raevis
(74) *Attorney, Agent, or Firm*—Sughrue Mion, PLLC

(57) ABSTRACT

A device for checking the fitting of a threaded cap onto a container is associated with automatic cap-fitting apparatus, particularly of the carousel type, which includes a rotatable platform which can move at least one container about a principal axis of the apparatus and at least one screwing head for screwing a cap onto a respective container so as to close the container as a result of its movement about the principal axis. Each screwing head is arranged to screw a cap onto a container with a predetermined tightening torque. The device comprises a sensor unit for identifying a moment at which each screwing head reaches the predetermined tightening torque, a sensor unit for detecting the angular position of each screwing head relative to the principal axis, at which the predetermined tightening torque is reached by the respective head, the two sensor units being connected to one another in order to provide an indication that the predetermined tightening torque has or has not been reached by a screwing head within a predefined angular interval of the movement of the screwing head relative to the principal axis of the apparatus.

3 Claims, 4 Drawing Sheets

65
59
61
57
56
63
61a
51
23
21
45
25
49
10
55
33
35
53
43
31
29
27
25a
49
39
10a
9
41
37
37b
X
37a
11a
8a
5
8
3
3a

DEVICE AND A METHOD FOR CHECKING THE FITTING OF A THREADED CAP ONTO A CONTAINER

DESCRIPTION

This is a 1.53(b) Divisional of U.S. Application Ser. No. 09/717,025 filed Nov. 22, 2000 now U.S. Pat. No. 6,679,026; the disclosure of which is incorporated herein by reference.

BACKGROUND OF THE INVENTION

The present invention relates in general to automatic cap-fitting apparatus.

More particularly, the invention relates to a device for checking the fitting of a threaded cap onto a container, the device being associated with automatic cap-fitting apparatus, particularly of the carousel type, including rotatable support means which can move at least one container about a principal axis of the apparatus and at least one screwing head for screwing a cap onto a respective container so as to close the container as a result of its movement about the principal axis, in which each screwing head is arranged to screw a cap onto a container with a predetermined tightening torque.

Automatic cap-fitting apparatus consists of machines which can tighten caps or stoppers onto the mouths of packaging containers, for example, of the type for containing consumable substances such as drinks. Some known types of cap-fitting apparatus for fitting threaded caps perform the operation to fit each cap onto a respective container whilst the container is travelling along a circular path, and these types are therefore generally known as carousel-type cap-fitting apparatus.

A known carousel-type cap-fitting apparatus is shown in appended FIGS. 1 to 3 which are a general front elevational view of the apparatus, a plan view of the apparatus viewed from the line II—II of FIG. 1, and a sectioned side elevational view of a screwing head of the apparatus, respectively.

The cap-fitting apparatus of FIG. 1, which is generally indicated 1, comprises a base 2 on top of which there is a unit 3, including a rotatable platform 3*a*, for supporting a plurality of containers 5, for example, bottles. The containers 5 are supplied to the platform 3*a* by means of a conveyor belt 7 of a packaging line (which is not shown since it is of generally known type).

The apparatus 1 further comprises a central pillar 8 which has a principal axis X and is rotated by a drive unit M housed in the base 2. A plurality of screwing heads 9 (only two of which are visible in FIG. 1) are associated with the pillar 8 so as to be movable in the same direction as the platform 3*a* along a circular path concentric with the axis X.

In particular, the heads 9 are movable relative to an upper framework 10 of the apparatus 1 which is connected to the base 2 so as also to be stationary. Associated with the framework 10 is a device 11 for supplying caps 11*a* withdrawn from a store (not shown) to the position in which each cap is to be coupled with a respective container 5 by being screwed thereon.

During the supply of a container 5 to the apparatus 1, the container is initially disposed on the conveyor belt 7 by which it is brought to the vicinity of a feed screw 13 in order to be engaged by a recess of a star-shaped toothed wheel 15. The wheel 15 is rotated by a respective shaft 15*a* which is also driven by the drive unit M. The container 5 is then brought to a position in which is engaged by a recess of another star-shaped toothed wheel 17 fixed for rotation with the central pillar 8 and thus rotatable about the axis X, the container 5 being supported on the rotatable platform 3*a* in a manner such that, whilst it follows an arcuate path about the axis X, a screwing head 9 can tighten a cap 11*a* onto the container. U-shaped support brackets 8*a* fixed to the pillar 8 may also be provided for engaging a region close to the mouth of each container 5 and thus holding it firmly in the erect position during the screwing operation. Upon completion of the operation to screw on the cap 11*a*, the container 5 is engaged by another star-shaped toothed wheel 19, the rotation of which is controlled by a shaft 19*a* driven by the drive unit M, in order to be returned to the conveyor belt 7, on which the container will continue towards a subsequent station of the line.

With particular reference to FIG. 3 of the drawings, each screwing head 9 comprises an upper portion 25 and a lower portion 27. The upper portion 25 has a roller 21 mounted for rotating about a radial axis, relative to the axis X, and slidably engaging a cam track 23 which has a descending portion and an ascending portion, with reference to the axis X, and has a pair of opposed working surfaces. A bush 25*a* fixed for rotation with the lower portion 27 of the head 9 is suspended on the portion 25 for rotation about an axis perpendicular to that of the roller 21, by means of a rolling-contact bearing. The portion 27 is substantially sleeve-shaped and has, on an outer surface, a set of axial teeth 29 for engagement by a corresponding set of teeth of a gear 31. The gear 31 in turn is connected rigidly to another gear 33, the teeth of which mesh with the corresponding teeth of a ring gear 35 having internal teeth and supported by stationary pillars 10*a* of the upper framework 10 of the apparatus 1.

As a result of the rotation of the central pillar 8 of the apparatus 1, each screwing head 9 thus performs, in addition to its revolving movement about the axis X, a rotary movement about its own axis with a multiplication factor, relative to the rotation of the pillar 8, determined by the transmission ratio between the ring gear 35 and the gear 33, and between the gear 31 and the set of teeth 29.

A cup-shaped element 37 bearing a ring 37*a*, for example such as an O-ring, for gripping a cap 11*a* to be screwed on is connected to the lower portion 27 of the screwing head 9. The element 37 is normally connected for rotation with the portion 27 but, by virtue of the presence of a release device of known type, generally indicated 39, can be released therefrom when a predetermined value of the torque with which a cap 11*a* is tightened onto the respective container 5 is reached. In particular, the device 39 may comprise two mutually facing disk-shaped elements 41 which perform the function of a mechanical, magnetic, or electromagnetic clutch, in known manner. Alternatively, each head 9 may itself comprise a dedicated electric motor (not shown in the drawings) so that the speed of rotation of the head can be varied by control of the intensity of the current supplied to the motor and, in this case, the current can be regulated in a manner such that it becomes zero at a predetermined value of the torque with which a cap 11*a* is tightened onto the respective container 5.

A thrust rod 43, arranged coaxially along each head 9 with the ability to slide axially, is mounted by means of a respective revolving-contact bearing so as to be rotatable relative to a supporting portion 43*a* slidable relative to the upper portion 25 of the head 9. The supporting portion 43*a* has a roller 45 which is rotatable about a radial axis, with reference to the axis X, so as to engage for sliding on a cam surface 47 integral with the cam track 23. Moreover, a helical spring 49 interposed between the cup-shaped element 37 and an abutment ring fixed to the rod 43 urges the rod towards the cam surface 47 so as to keep the roller 45 in engagement with this surface.

When a cap 11*a* has been screwed onto the respective container 5 by the head 9, the shape of the cam 23 causes the screwing head 9 to be raised by means of the roller 21 whilst the surface of the cam 47 brings about a downward movement of the thrust rod 43, by means of the roller 45, so that, during the downward movement of the thrust rod 43, its end remote from the portion 43*a* releases the lower cavity of the element 37 from any cap 11*a* remaining associated therewith.

In FIG. 2, the operative steps of a head 9 of the apparatus 1 are indicated schematically, purely by way of example, with particular reference to the case of a cap 11*a* having a thread with a single start.

Starting from the position bearing the reference 0, the head 9, which moves clockwise with reference to the drawing, moves to the position S (start) covering an arc A the extent of which is normally about 70°. Whilst the screwing head 9 is moving along the path A, a container 5 is supplied to the apparatus 1 by means of the belt 7, the screw 13, and the star-shaped wheel 15, and a respective cap 11*a* is supplied, by means of the device 11, to the position above the container 5 on which it can be engaged by a screwing head 9.

Between the positions S and ON, the screwing head 9, with the respective cap 11*a*, is moved downwards as a result of the engagement of the roller 21 with a descending portion of the cam 23 until the cap 11*a* is positioned adjacent the threaded neck of the container 5. This stage, which is performed along the portion of the arcuate path indicated B, normally has an angular extent of about 30°.

An arc C having an angular extent of about 100°, along which the cap 11*a* is normally screwed onto the container 5 to the predetermined tightening torque, extends between the positions ON and OFF.

In the subsequent portion of the arcuate path D which extends between the positions OFF and R (result) through an angle of about 60°, the head 9 is raised and released from the cap 11*a* and from the container 5. If the head 9 is of the electromagnetic type, its electrical disconnection takes place, and the supply to its motor is thus stopped, along the path D.

In the arcuate portion E which extends between the positions R and 0 and the angular amplitude of which is normally about 100°, the container 5*a* which has just been capped is discharged from the apparatus 1 and returned once more to the conveyor belt 7 by means of the star-shaped wheel 19.

Known apparatus of the type described above cannot normally check that the operation to screw a cap onto the respective container has been performed correctly without this leading to considerable complexity of the apparatus. In particular, in the most common case, it is necessary to provide an additional checking station downstream of the apparatus 1 in order for this operation to be performed by suitable personnel so that containers which have been closed incorrectly can be removed.

It is in fact inevitable that, as a result of the automatic screwing of the threaded caps onto the respective containers, some of the caps will be fitted incorrectly, and there is therefore a reject rate which, although it is small, is not zero. The average reject rate for apparatus which has been operating for a few years and which has undergone good and regular maintenance, may be of the order of 4–8%. The causes of rejection are normally the following:

- a missing cap and/or container, which has disappeared for accidental reasons after passing presence sensors disposed upstream of or adjacent the machine;
- crooked supply of a cap, that is, with its axis not coaxial with that of the thread on the mouth of the container;
- an incomplete or faulty thread and/or closure surface of the container or of the cap;
- a cap and/or a threaded container mouth with longitudinal splits;
- rotation of a container as a result of the rotation of the respective screwing head;
- faulty restraint of the cap by the screwing head so that relative slippage takes place between the cap and the head.

As a result of an analysis of the causes of rejection indicated above, it has been concluded that each of these causes leads to a well-defined outcome of the operation to screw on the cap. In particular, if the container or the cap is missing, if the container is rotated by the screwing head, or if the cap is not fixed correctly relative to the head, the screwing head does not succeed in reaching the predetermined tightening torque within the arcuate interval C; when a cap is supplied crooked, the predetermined tightening torque is reached in a region preceding the start of the arcuate interval C, that is, before the ON position; if the threads or the contact surfaces between the cap and the container are uneven or if the mouth of a container or a cap are split, the predetermined tightening torque is reached after the OFF position.

It has therefore been concluded that the operation to screw on the cap can be considered to have been performed correctly and the respective container 5*a* can be considered "good" only when the predetermined torque for the tightening of a cap onto the respective container is reached within the angular interval C, that is, between the positions ON and OFF, whereas in all other cases, the container 5*a* should be considered "not good" and therefore rejected downstream of the apparatus 1.

SUMMARY OF THE INVENTION

In particular, the present invention provides a device of the type indicated at the beginning of the present description, characterized in that it comprises:

- first sensor means for identifying a moment at which each screwing head reaches the predetermined tightening torque,
- second sensor means for detecting an angular position of each screwing head, relative to the principle axis, at which the predetermined tightening torque is reached by the respective head,
- the first and second sensor means being connected to one another in order to provide an indication that the predetermined tightening torque has or has not been reached by a screwing head within a predefined angular interval of the movement of the screwing head relative to the principal axis of the apparatus.

By virtue of this characteristic, it is possible to check, during the operation to screw the cap onto a container, and hence in real time, that the operation has been performed correctly so that it is possible to arrange for the containers which are considered faulty to be removed automatically immediately downstream of the machine, without the need to provide additional stations. In particular, the invention renders the execution of the step of screwing the caps onto the respective containers highly reliable since the containers which are closed incorrectly can be identified with certainty and consequently removed, and the container packaging line as a whole is rendered more economical since the presence of a checking station downstream of the cap-fitting apparatus is no longer required.

The device preferably includes processing means which can store data relating to the predefined angular interval and process the signals coming from the first and second sensor means in order to check, for each screwing head, whether the predetermined tightening torque was reached within the predefined angular interval and to assign to each container a parameter indicative of the fact that the screwing operation has or has not been concluded correctly for that container.

The device advantageously includes sensor means for detecting the presence of the container and for producing a respective signal which can be correlated with the above-mentioned indicative parameter in order to provide a datum connected with the possible removal of the container.

The device according to the invention can thus recognize completely automatically the containers which should be rejected after the operation to screw on the respective cap because this operation has not taken place correctly.

According to another aspect of the invention there is provided is cap-fitting apparatus equipped with a checking device of the above-mentioned type.

According to a further aspect of the invention, there is provided a method of checking the fitting of a threaded cap onto a container by means of automatic cap-fitting apparatus, particularly of the carousel type, including rotatable support means which can move at least one container about a principal axis of the apparatus and at least one screwing head for screwing a cap onto a respective container so as to close the container as a result of its movement about the principal axis, each screwing head being arranged to screw a cap onto a container with a predetermined tightening torque, characterized in that it comprises the steps of:

- defining a predetermined angular interval of the movement of the at least one container about the principal axis of the apparatus within which the screwing of a cap onto the respective container with the predetermined tightening torque should be achieved,
- checking whether the predetermined tightening torque of a cap has been reached within the predetermined angular interval, and
- assuming that a container has been closed correctly if the predetermined tightening torque of the respective cap has been reached within the predetermined angular interval.

BRIEF DESCRIPTION OF THE DRAWINGS

Further characteristics and advantages of the invention will become clearer from the following detailed description, provided purely by way of non-limiting example with reference to the appended drawings, in which.

DETAILED DESCRIPTION OF THE INVENTION

Figure 4:
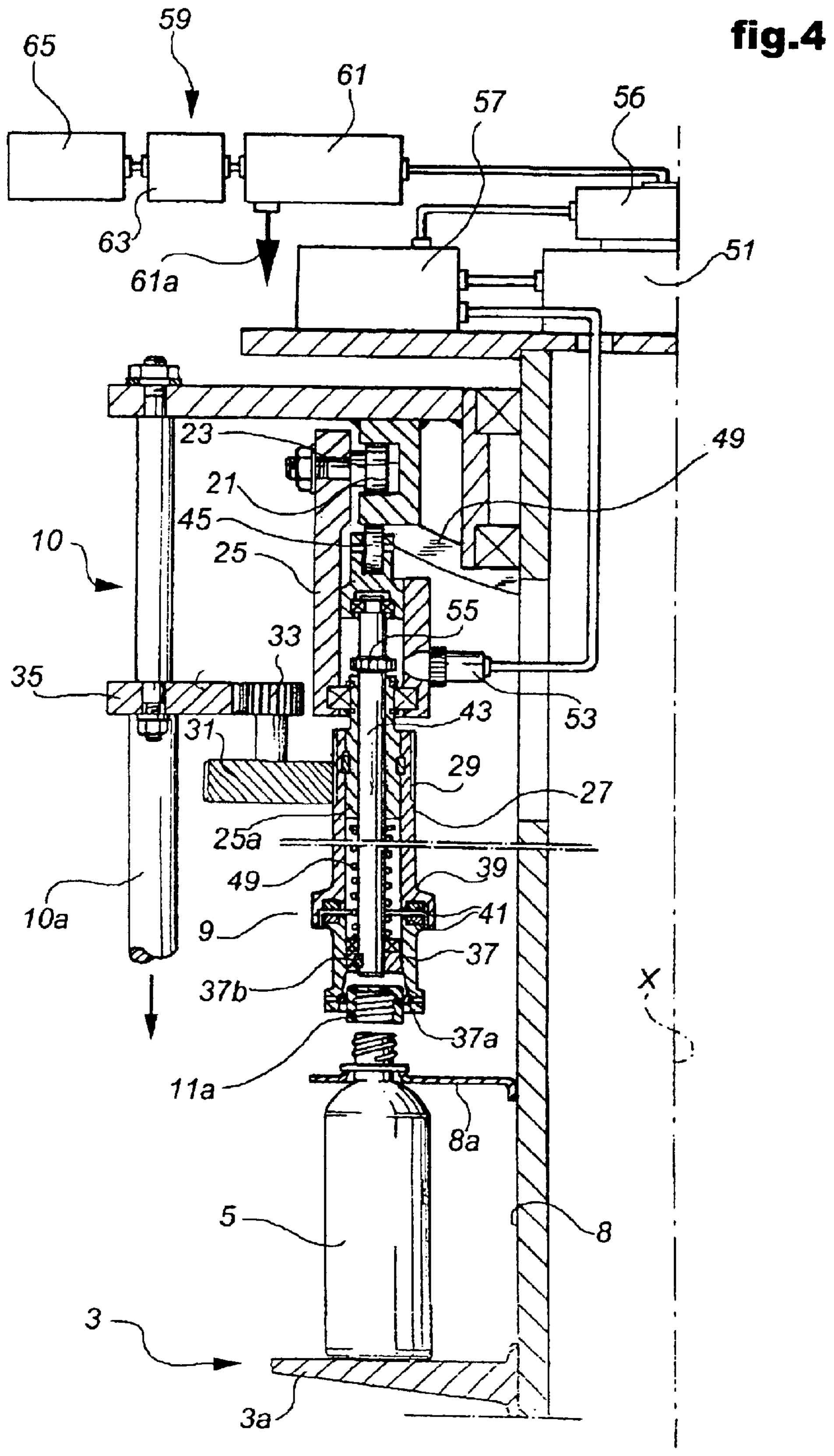
FIG. 4 is a view similar to that of FIG. 3, showing a screwing head of apparatus according to the invention.

With particular reference to FIG. 4, in which the same reference numerals have been used to indicate parts identical or similar to those described above for the apparatus of the prior art, the apparatus 1 of the invention comprises a device for detecting whether the operation to screw a cap 11*a* onto the respective container 5 has been performed correctly, that is, whether it has taken place with the predetermined tightening torque, within a predetermined angular interval of the rotation of the container 5 about the axis X. This predetermined angular interval corresponds to the angular interval C of FIG. 2 which corresponds to an arcuate path disposed between the positions ON and OFF.

According to the invention, the device can thus recognize the moment at which each screwing head 9 reaches the predetermined tightening torque for the respective cap 11*a* and can determine whether or not this moment has been reached whilst the respective head 9 is disposed within the angular interval C.

For this purpose, a phonic wheel 55 which, in the specific case, is constituted by a toothed wheel of the type with nine teeth, is keyed to each of the thrust rods 43, facing at least one proximity sensor 53. The sensor 53 is arranged, in known manner, to generate a square wave two different signal levels of which are reached when the sensor 53 detects the passage of the tip of a tooth or of a recess interposed between two consecutive teeth.

If a high degree of accuracy is required in indicating when conditions of movement or of stoppage of the wheel 55 are reached, it is possible to use a pair of sensors 53 arranged in diametrally opposed positions so that one of the sensors detects the passage of the tip of a tooth of the wheel 55 in front of the sensor, whilst the opposed sensor detects the passage of a recess. In this way, since each of the two proximity sensors 53 generates a respective square wave which is out of phase with the wave generated by the opposed sensor, the two wave-forms can be combined to produce a resultant wave having a period shorter than that of each of the waves generated by a single sensor so as to achieve greater accuracy in the reading of the instantaneous condition of movement of the phonic wheel 55.

Moreover, the thrust rod 43 is fixed for rotation with the cup-shaped body 37 by means of a key 37*b* or a similar member for connecting it for rotation, so that the phonic wheel 55 rotates at the same angular velocity as the cup-shaped body 37, and hence as the respective cap 11*a*, during the screwing operation.

Figure 1:
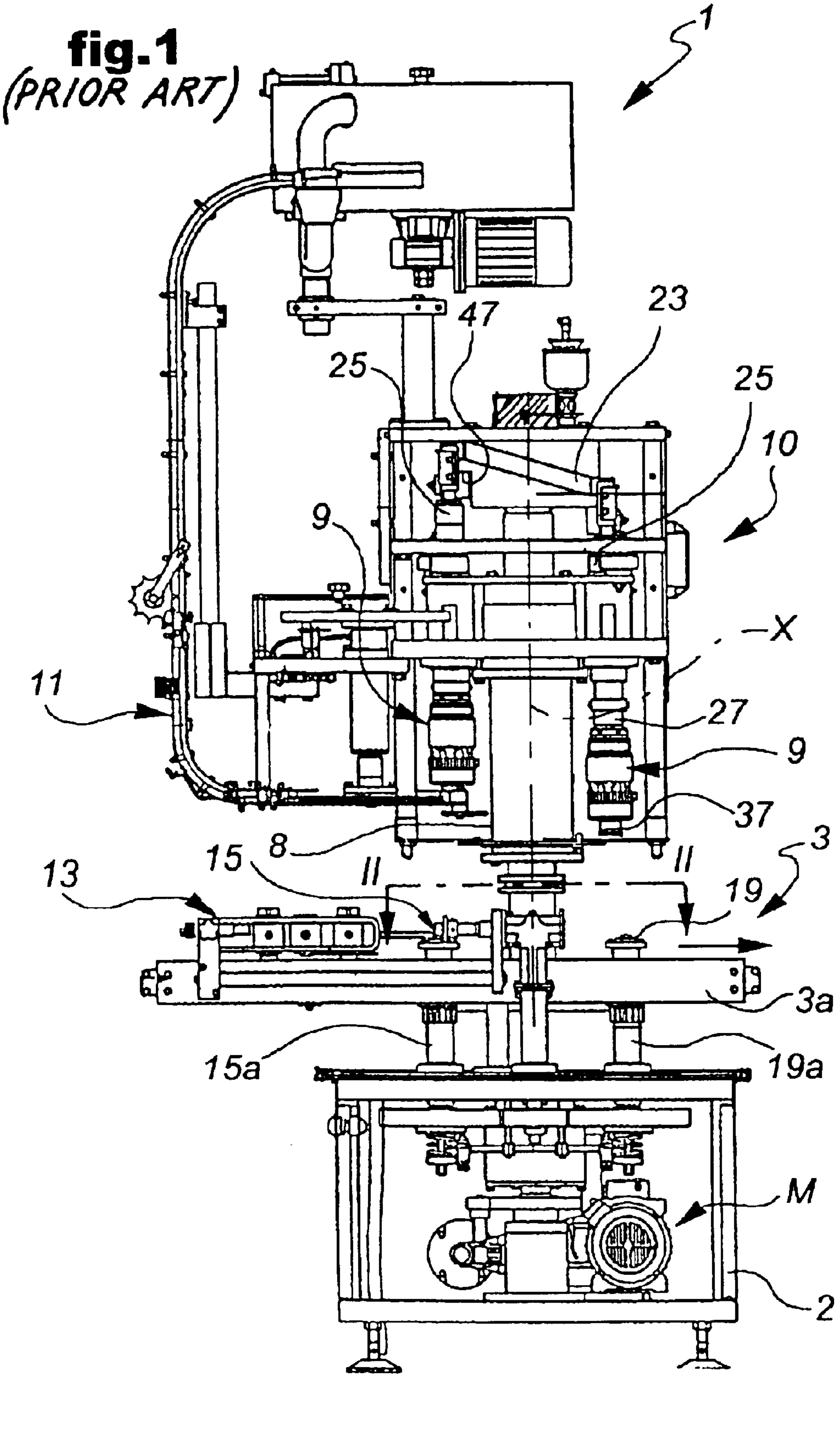
fig.1 (PRIOR ART)
FIG. 1 is a front elevational view of automatic carousel-type cap-fitting apparatus according to the prior art.
Figure 2:
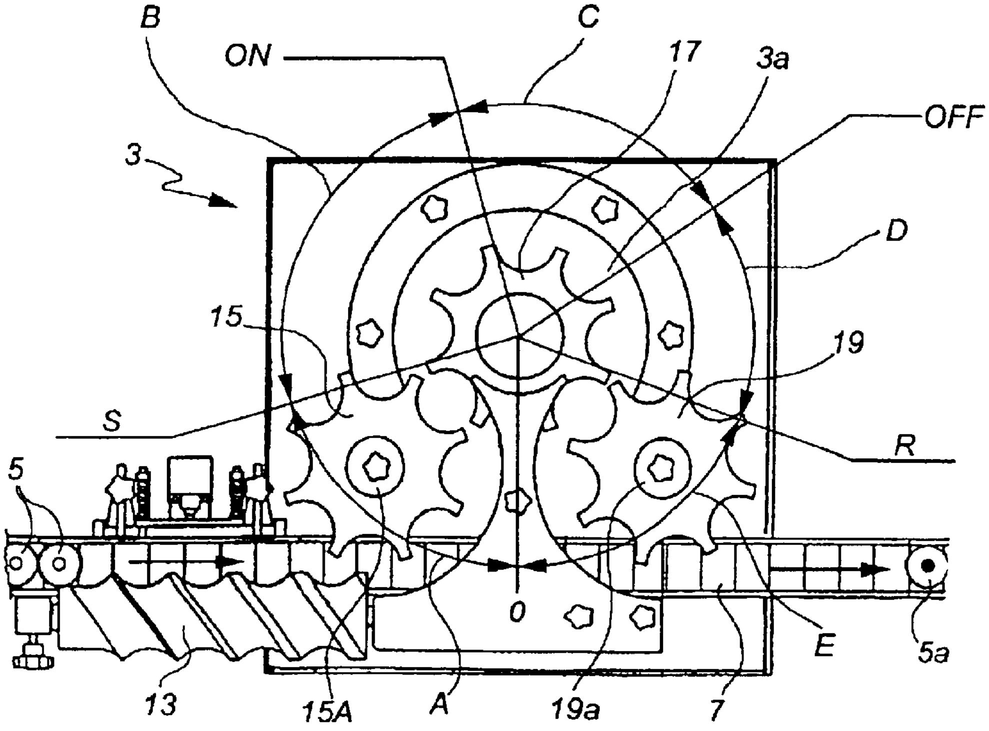
fig.2 (PRIOR ART)
FIG. 2 is a schematic elevational view taken from the line II—II of FIG. 1.
Figure 3:
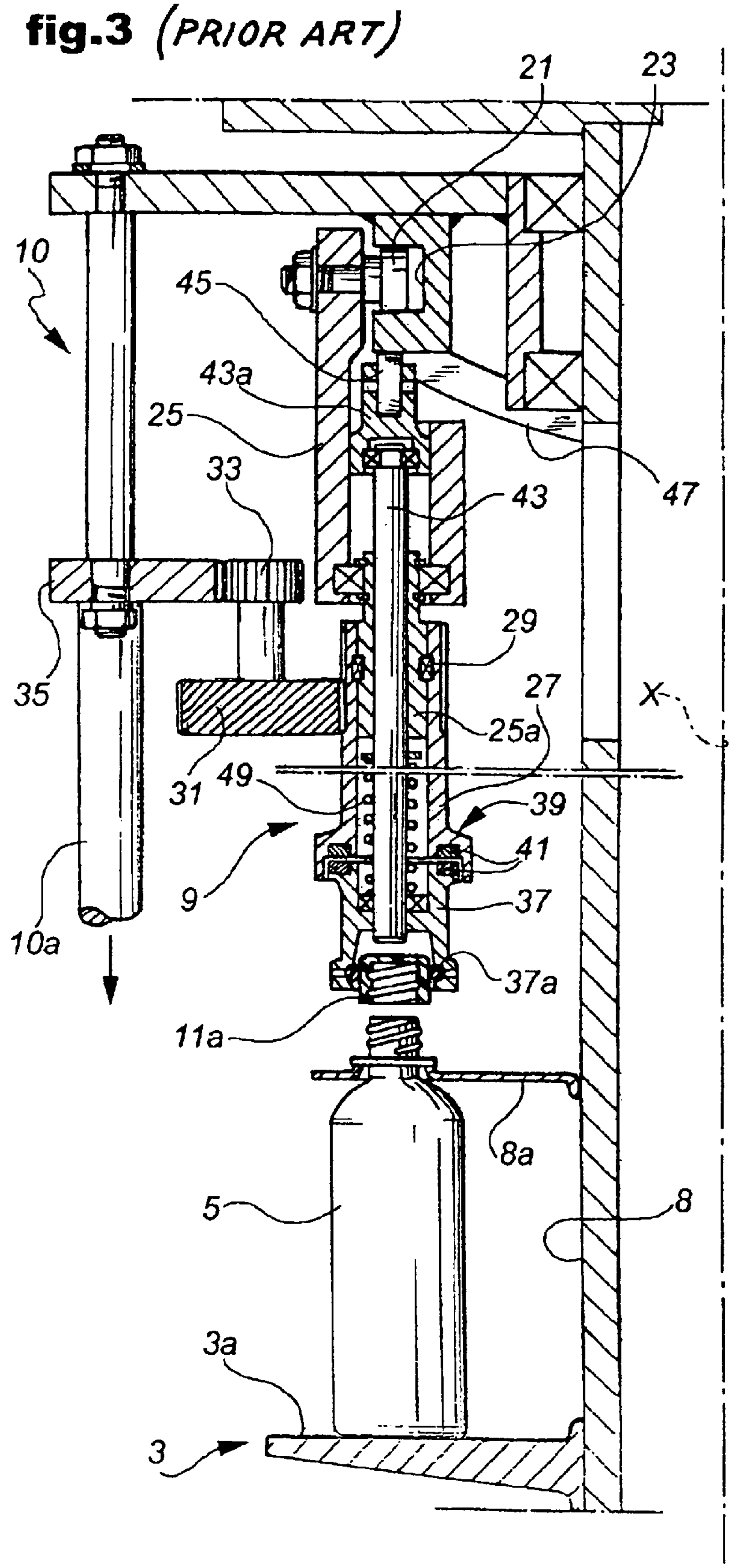
fig.3 (PRIOR ART)
FIG. 3 is a schematic longitudinal section showing, on an enlarged scale, a screwing head of the apparatus of the prior art shown in FIG. 1.

A member for detecting the angular position of each of the screwing heads 9 is connected to the central pillar 8 of the apparatus 1. This member is preferably constituted by a single sensor 51 formed by an absolute encoder which can detect the instantaneous angular position of the pillar 8 relative to a fixed reference of the apparatus 1, for example, fixed to the base 2, the angular-position reading produced by the sensor begin zeroed upon each complete revolution of the pillar 8 when a stationary reference, for example, corresponding to the position 0 of FIG. 2, is passed.

Alternatively, the absolute encoder 51 may be replaced by a relative encoder which can generate a pair of signals, one relating to the execution of a complete rotation through 360° and one relating to a series of angular intervals of predetermined amplitude within each rotation through 360°.

The sensors provided for detecting the execution of the screwing operation, that is, for determining instantaneously whether the rod 43 is in a moving or stopped condition, may also be formed with the use of devices other than the proximity sensor 53 facing the phonic wheel 55. In particular, a relative encoder for each screwing head 9 or a respective tachometric dynamo may be used for this purpose.

In the embodiment illustrated, in which the absolute encoder 51 is associated with the pillar 8 and each head 9 has a sensor unit including a phonic wheel 55 and a proximity sensor 53, the instantaneous position of the encoder 51 is read by a control module 57 each time the proximity sensor 53 associated with one of the screwing heads 9 detects a change between a moving condition and a stopped condition of the respective phonic wheel 55, or vice versa, for example, corresponding to the stopping of the rotation of the wheel 55, so that a signal is generated, the value of which is correlated with this instantaneous position of the respective head 9. The module 57 also performs a check to ascertain that the value of the signal thus generated is within a range of permissible values, the ends of which range correspond to the values which are generated by the system for the end positions of the angular interval C, that is, the positions ON and OFF. It is thus possible to determine in a simple manner whether the predetermined torque for the tightening of a cap 11*a* onto the respective container 5 has in fact been reached within the predefined angular interval, that is, whether a cap has been screwed on correctly. If, as a result of this check, it is clear that the cap 11*a* has been fully screwed onto the respective container 5 within the angular interval C, that is, between the positions ON and OFF, a parameter indicative of the execution of the screwing operation is thus correspondingly assigned a value for that container 5, whereas if the screwing step was concluded before the ON position or after the OFF position, the screwing step is considered to have been executed incorrectly and the above-mentioned parameter is assigned a value taking account of this outcome.

The information thus obtained by the module 57 is transferred, by means of a rotary collector 56 advantageously of the mercury type, to a processing unit 59 which is normally stationary relative to the apparatus 1. The unit 59 comprises a main module 61 having the function of receiving and processing, in real time, the data relating to the process of screwing on the caps 11*a*, during its execution. Connected to the module 61 is a module 63 or PLC in which there is a memory region having the function of storing the information coming from the module 61 for statistical purposes and/or of interfacing with other stations of the line in which the apparatus 1 operates. The module 63 is arranged, in particular, to store data coming from a sensor (not shown) for detecting the presence of the containers 5, which is associated with the apparatus 1, and to correlate this data with that coming from the sensors which can determine whether the screwing operation has been concluded correctly for that container. The module 63 thus acquires information relating to each container 5 and detected by the presence sensor, so that it is possible to determine which containers should be rejected downstream of the apparatus 1 and consequently to assign a value to a rejection parameter for each container 5 detected by the presence sensor. The module 63 in turn may be connected to an I/O (input/output) module 65 such as a display terminal which can be used for the input and display of data.

Moreover, the processing module 61 may be supplied either with signals coming from the interface module 65 and/or from the PLC module 63 in order to process this information, together with that reaching it from the rotary collector 56, and to utilize the result of this processing in order to transmit information, by means of an output 61*a*, to other stations of the line and/or to a personal computer or other processing device by means of which the operation of the entire checking device can be supervised.

What is claimed is:

1. A method of checking the fitting of a threaded cap onto a container by means of automatic cap-fitting apparatus of the carousel type, including rotatable support means which can move at least one container about a principal axis of the apparatus and at least one screwing head for screwing a cap onto a respective container so as to close the container as a result of its movement about the principal axis, each screwing head being arranged to screw a cap onto a container with a predetermined tightening torque, the method comprising the steps of:

defining a predetermined angular interval of the movement of the at least one container about the principal axis of the apparatus within which the screwing of a cap onto the respective container with the predetermined tightening torque should be achieved, checking whether the predetermined tightening torque of a cap has been reached within the predetermined angular interval, and assuming that a container has been closed correctly if the predetermined tightening torque of the respective cap has been reached within the predetermined angular interval.

2. The method as claimed in claim 1, further comprising the steps of generating a signal the value of which is indicative of the angular position of each screwing head, relative to the apparatus, in which the screwing head completes the operation to screw a cap onto a respective container, checking whether the value of the signal thus generated is within a range of permissible values correlated with the values corresponding to the ends of the predetermined angular interval and, as a consequence of the outcome of the checking step, assigning a value to a parameter indicative of the correctness of the execution of the operation to screw a cap onto the respective container.

3. The method as claimed in claim 2, further comprising the step of using the value of the parameter and the signal coming from a sensor for detecting the presence of the respective container in order to assign a value to a rejection parameter of the respective container.

* * * * *